US007641741B2

(12) United States Patent
Boersma

(10) Patent No.: US 7,641,741 B2
(45) Date of Patent: Jan. 5, 2010

(54) PRECISION NOTCH MACHINING FIXTURE AND METHOD

(76) Inventor: Drew H. Boersma, 2100 Woodley Creek, Comstock Park, MI (US) 49321

( * ) Notice: Subject to any disclaimer, the term of this patent is extended or adjusted under 35 U.S.C. 154(b) by 235 days.

(21) Appl. No.: 11/710,143

(22) Filed: Feb. 23, 2007

(65) Prior Publication Data

US 2008/0203643 A1 Aug. 28, 2008

(51) Int. Cl.
*B23D 81/00* (2006.01)

(52) U.S. Cl. .......................... 148/194; 266/49; 269/296

(58) Field of Classification Search ................... 266/48, 266/49; 269/296; 148/194, 196
See application file for complete search history.

(56) References Cited

U.S. PATENT DOCUMENTS 3,944,203 A * 3/1976 Brekelbaum ................ 269/296
6,068,541 A * 5/2000 Dwyer ....................... 269/296
2007/0052146 A1* 3/2007 Huisken et al. ............... 269/63

* cited by examiner

*Primary Examiner*—Scott Kastler
(74) *Attorney, Agent, or Firm*—Varnum, Riddering, Schmidt & Howlett LLP

(57) ABSTRACT

A fixture includes an enlarged plate having slots in an upper surface, and support members are secured to the plate at the slots. The fixture is utilized to machine parts that are initially flame-cut from a large plate/sheet of hot-roll steel. A plurality of notches are flame-cut into the perimeter of the part. The support members engage the flame-cut slots to secure the part to the plate for machining a first side of the part. Precision notches are machined into the part, and precisely-shaped protrusions on the support members are closely received in the precision notches to precisely locate the part for further machining on a second side thereof.

10 Claims, 5 Drawing Sheets

PRECISION NOTCH MACHINING FIXTURE AND METHOD

BACKGROUND OF THE INVENTION

Various types of dies for stamping/forming sheet parts from sheet metal have been developed. Such dies are typically custom made to produce a particular part by a skilled tradesman. Numerous components of such dies are often made from hot-roll steel plate. Such components are typically rough-cut from a large plate of hot-roll steel utilizing a flame-cutting process, and the upper and lower surfaces of the plate are ground flat in a "Blanchard" grinder or the like. Die shops typically receive the rough-cut component from the supplier with flat ground parallel upper and lower surfaces, and a rough-cut perimeter having the approximate size and shape of the finished stripper or other such component. In general, hot-roll steel plate and the like can be rough cut more quickly and economically by flame-cutting than by sawing or the like. Thus, flame-cutting the part to the approximate final shape and size reduces the amount of labor by a skilled tradesman that would otherwise be required.

Typically, the rough-cut part/work piece must be further machined to form the various openings and other precision-machined features required for the particular die component being fabricated. Such plates often require machining operations to be performed on both the upper and lower side surfaces. To achieve this, the work piece is first clamped to the bed of a machine tool and machined on a first side. After completion of the machining operation on the first side of the part, the part is then flipped over and machined on the other side. The features machined into both sides of the part often need to be located precisely relative to one another, and the process of setting up the plate after flipping it over therefore tends to be time-consuming because the plate needs to be precisely located ("set up") utilizing the features previously machined into the component. This set-up time results in not only extra labor on the part of the die maker or machinist, but also results in down time for the machine during the set-up operation.

Accordingly, a way to alleviate the drawbacks associated with prior arrangements for machining components made of hot-roll steel would be beneficial.

SUMMARY OF THE INVENTION

The present invention provides a way to quickly and easily secure a piece of hot-roll steel to a machine tool for machining. The part being machined can be machined on a first side and then flipped over for machining on a second side. The fixture/device of the present invention securely holds the part for machining, and also precisely locates the part without conventional manual set-up. The part is made from a piece of hot-roll steel that is cut from a larger sheet or plate of stock utilizing a flame-cutting process. The perimeter of the piece is flame-cut to the required size and shape for the part being made, and one or more locating/supporting features such as notches are flame-cut into the perimeter/edge of the piece. The notches preferably have a U-shape in plan view, and the notches are spaced apart around the perimeter of the piece of steel.

A fixture according to one aspect of the present invention is utilized to secure the flame-cut part to a machine tool. The fixture includes an enlarged plate having a flat upper surface with T-slots forming a grid on an upper side of the plate. The plate is secured to a bed of a mill or other machine tool utilizing conventional strap-type clamps or other suitable arrangement. The fixture includes a plurality of support members that are secured to the plate utilizing screws and T-nuts positioned in the T-slots. The support members include a key-type feature that is closely received in the T-slots to thereby prevent movement of the support member in directions transverse to the T-slots. The support members also include slot-engaging portions that are at least partially received in the flame-cut notches of the part to thereby prevent or limit movement of the part relative to the support member. The support members also include protrusions that may be in the form of flanges that have upper and lower surfaces. When the support members are in position, the part rests on the upper surfaces of the protrusions, and the lower surfaces of the protrusions contact the upper surface of the plate. The part is thereby supported away from the surface of the part at a distance equal to the thickness of the protrusions.

The fixture includes clamp members that are connected to the support members by bolts or the like. The clamp members engage the surface of the part at the notches and securely clamp the part to the support members. The clamp members have a cut-away portion that provides clearance for machining a small precision notch in the part at each flame-cut notch.

After machining on a first side of the part is completed and precision notches are machined at the flame-cut notches, the part is flipped over (i.e. rotated 180° relative to a horizontal axis) and the part is again secured to the plate utilizing the support members and clamp members. The support members include a small protrusion at an end of the notch-engaging portions of the support members having a size and shape closely corresponding to the size and shape of the precision notches. The small protrusions are positioned in the precision notches, and the clamp members are utilized to clamp the part in place on the plate. The small protrusions engage the precision notches and thereby precisely position the part relative to the support members. Because the support members are precisely located on the plate by the key-type feature which is received in the T-slots, the position of the part on the mill is therefore precisely controlled, and the time and effort required to secure and position the part on the second side is greatly reduced.

These and other features, advantages, and objects of the present invention will be further understood and appreciated by those skilled in the art by reference to the following specification, claims, and appended drawings.

BRIEF DESCRIPTION OF THE DRAWINGS

FIG. 5;

FIG. 7.

DETAILED DESCRIPTION OF PREFERRED EMBODIMENT

This application is related to co-pending U.S. patent application Ser. No. 11/709,951, filed on Feb. 23, 2007, entitled MODULAR TOOLING SYSTEM A ND METHOD, the entire contents of which are incorporated herein by reference.

Figure 1:
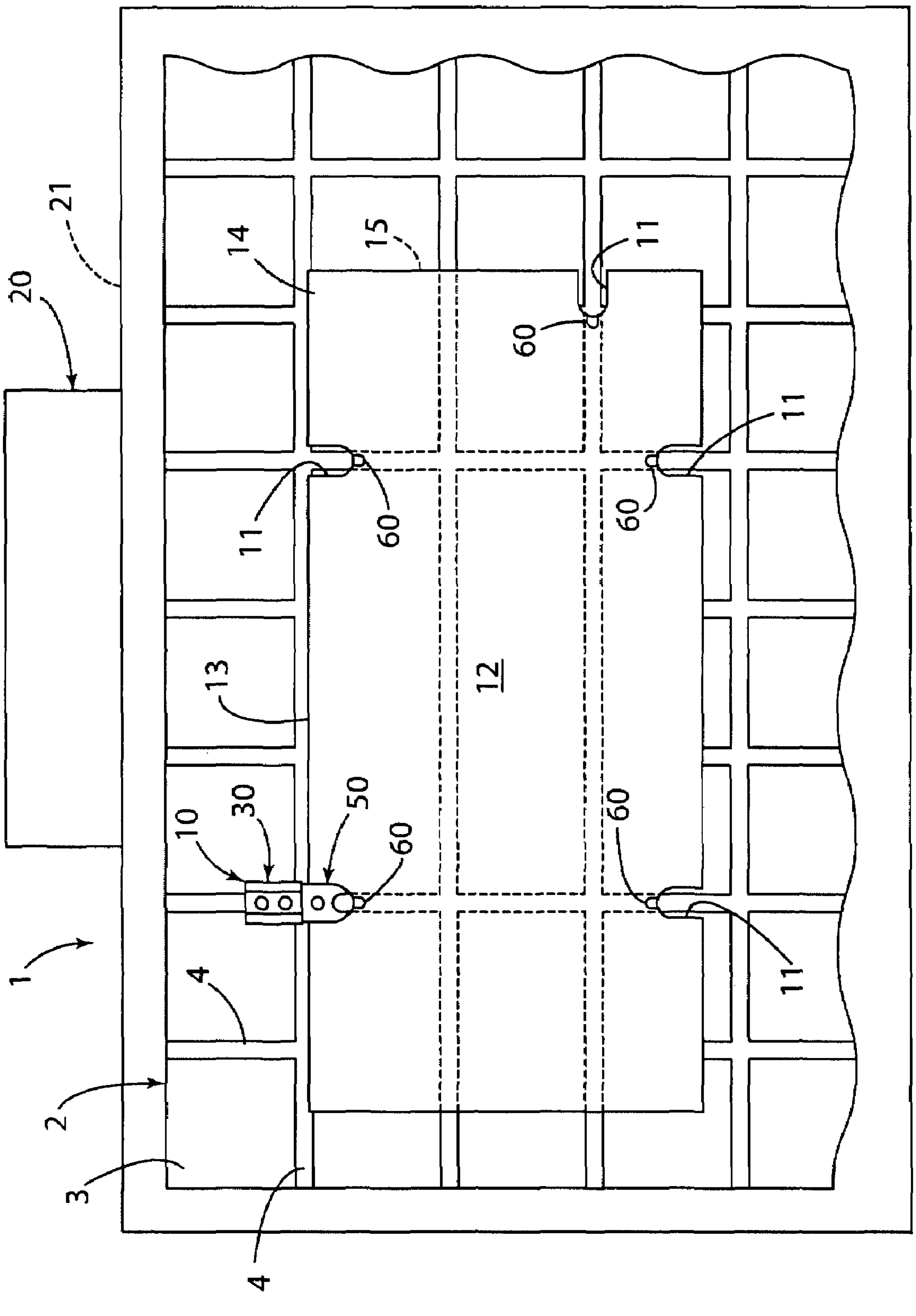
FIG. 1 is a partially schematic, fragmentary, plan view of a precision notch device according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
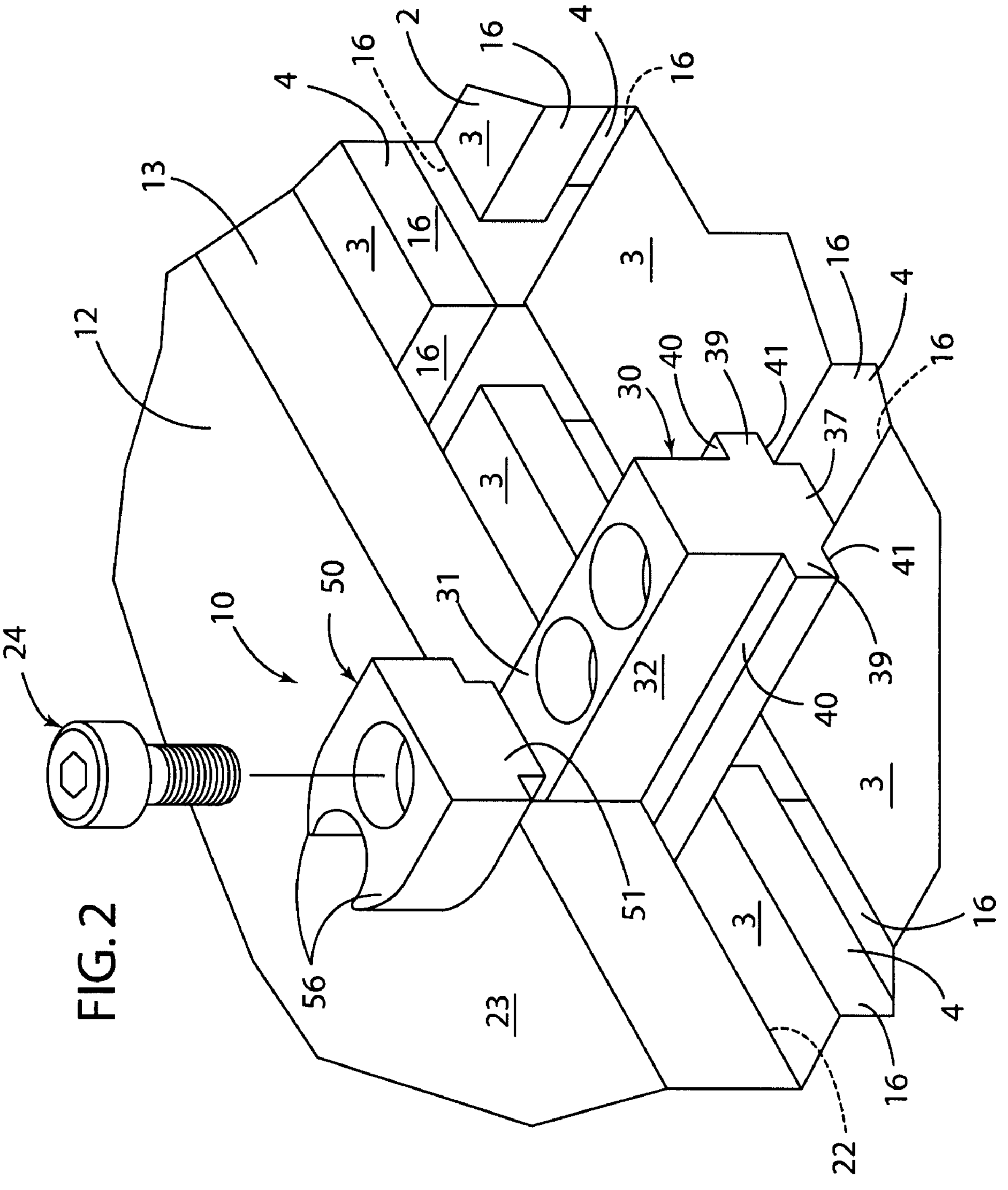
FIG. 2 is a fragmentary isometric view of a portion of the device of FIG. 1.

A precision notch device 1 (FIG. 1) according to one aspect of the present invention includes a plate member 2 having a flat upper surface 3 and a plurality of T-slots 4. T-slots 4 have an upside-down T-shaped cross sectional shape to receive T-nuts (not shown) of a type that is generally well-known in the art. A plurality of retainers 10 engage flame-cut notches 11 in a work piece/part 12 to retain the part 12 on the plate member 2 via T-nuts received in grooves or slots 4. Part 12 may be made of hot-roll steel, and includes a perimeter 13 that is formed by flame-cutting the part 12 from a larger plate of hot-roll steel. Upper and lower surfaces 14 and 15 of part 12 are precision ground flat surfaces. The plate member 2 may be secured to a bed 21 of a mill 20 or other machine tool utilizing a conventional strap-type clamp (not shown) or other suitable securing arrangement. The machine tool 20 may be a CNC mill, conventional mill, or other suitable machine tool having an appropriate capacity and capability for the machine operations to be performed on part 12. It will be understood that machine tool 20 may comprise any one of a variety of machine tools or the like as required for a particular application. With further reference to FIG. 2, each T-slot 4 includes parallel side surfaces 16 that are formed within a high tolerance such that the width of the upper portions of T-slots 4 is held to a relatively high tolerance. Also, the positions of the T-slots 4 is also within a relatively high tolerance.

Figure 6:
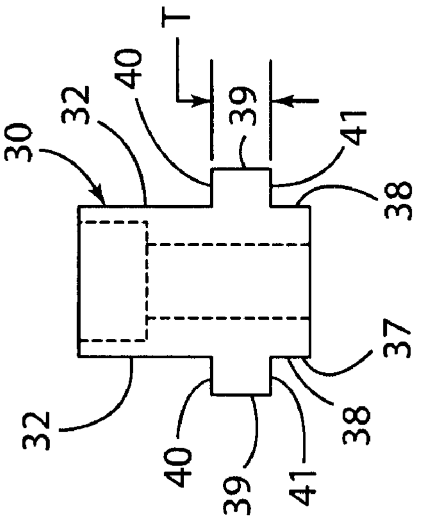
FIG. 6 is a view of the support member of FIG. 5 taken along the line VI-VI.
Figure 5:
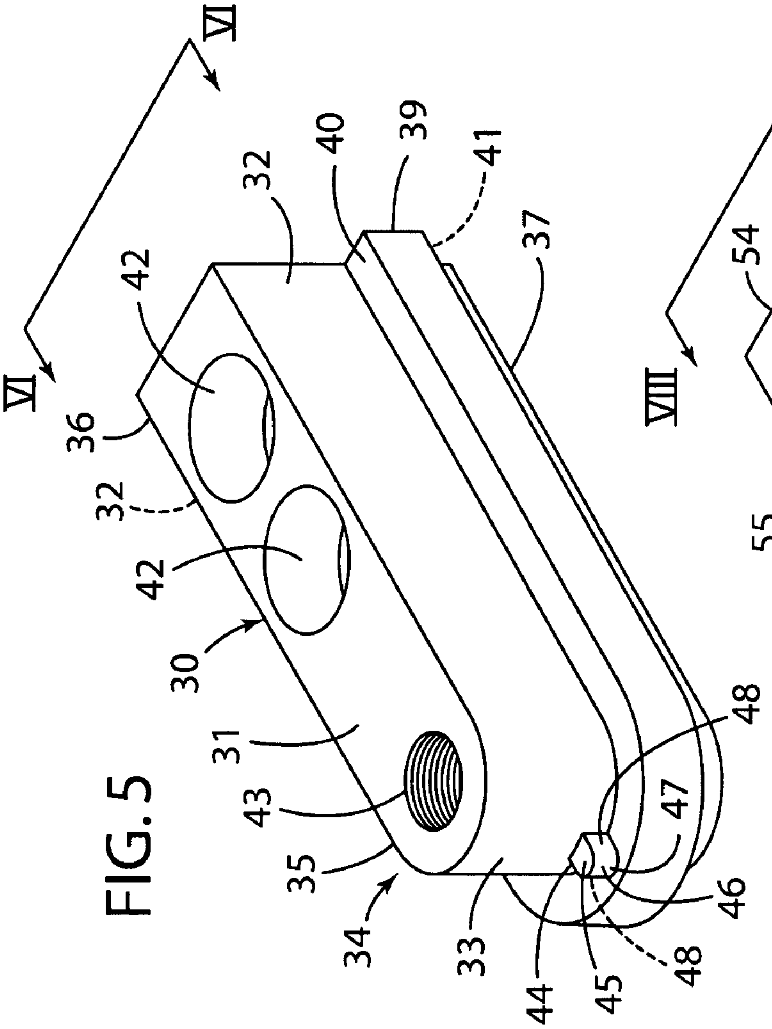
FIG. 5 is an isometric view of a support member forming a part of the device of FIG. 1.

Each retainer 10 includes a support member 30 and a clamp member 50 that is operably interconnected to the support member 30 by a movable member such as socket head cap screw 29. Support members 30 include a body portion 31 (see also FIGS. 5 and 6) having first and second ends 35 and 36, respectively, and flat, parallel opposite side surfaces 32. End 35 includes a curved end surface 33 that extends between the side surfaces 32. Portions of the side surfaces 32 and end surface 33 together define a notch-engaging portion 34 of support members 30 that is received in flame-cut notches 11 of part 12.

Each retainer 10 also includes a downwardly-extending key 37 having parallel opposite side surfaces 38 that define a dimension therebetween that is equal to, or slightly smaller than, the width of T-slots 4 defined by the distance between surfaces 16 of T-slots 4. As shown in FIG. 2, key 37 is closely received in T-slots 4 to thereby position support members 10 relative to plate 2.

Referring again to FIGS. 5 and 6, support members 10 include protrusions 39 having a flange-like shape with flat upper surfaces 40 that are parallel to flat lower surfaces 41. In use (FIG. 2), a lower surface 22 of part 12 contacts upper surfaces 40 of protrusions 39 of support members 30, and lower surfaces 41 of protrusions 39 contact upper surface 3 of plate 2, such that lower surface 22 of part 12 is spaced apart from surface 3 a distance equal to the thickness "T" (FIG. 6) of protrusions 39.

Support members 30 include counter-bored openings 42 (FIG. 5) that receive threaded fasteners or the like (not shown) that securely interconnect/clamp support members 30 to T-nuts (not shown) that are positioned in T-slots 4 of plate 2. Support members 10 also include a threaded opening 43 that receives cap screw 29 (FIG. 2) to clamp the clamp members 50 to support members 30 and thereby clamp part 12 in place on support members 30.

Figure 3:
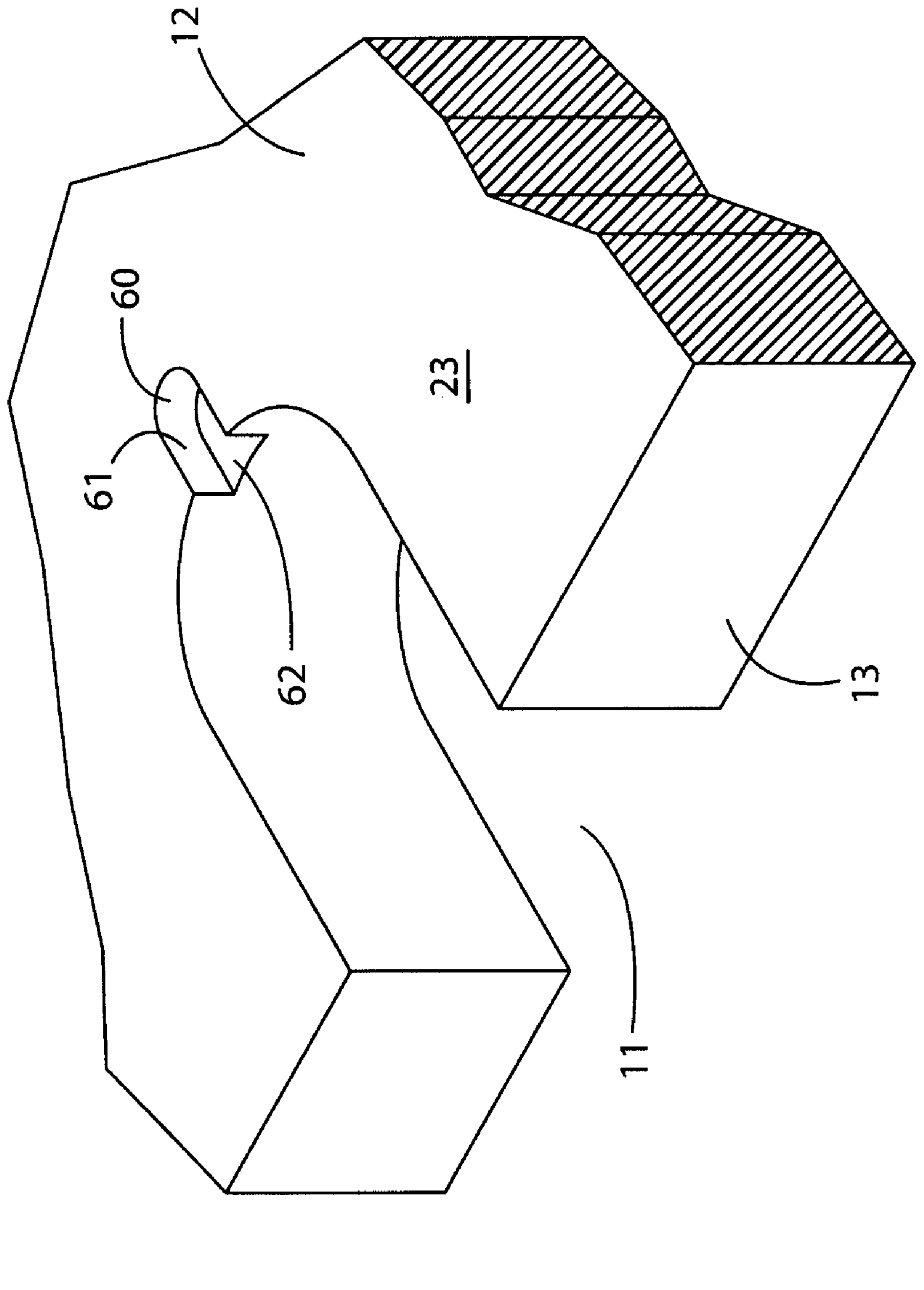
FIG. 3 is a fragmentary isometric view of a work piece showing a large flame-cut notch and a smaller precision notch machined into the work piece.

Support members 30 include a small, precise, bullet-shaped protrusion 45 (FIG. 5) extending from curved end surface 33. Protrusion 45 includes a precisely-formed vertical surface 46 having a curved end portion 47 and flat opposite side portions 48. Vertical surface 46 extends orthogonally from upper surface 40 of protrusion 39, and ends at corner 49 formed at the intersection of vertical surface 46 and a top surface 44 of small protrusion 45. As described in more detail below, surface 46 has substantially the same size and shape as precision notch 60 (FIG. 3) to thereby position and retain part 12 on support members 30.

Figure 8:
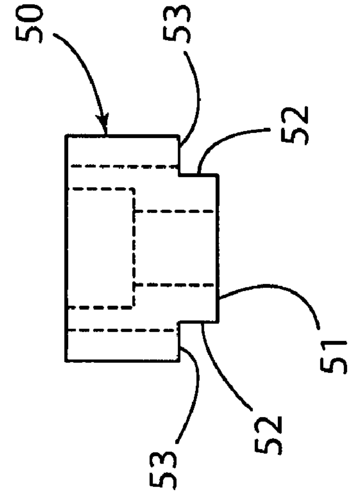
FIG. 8 is a view of the clamp member taken along the line IIX-IIX.
Figure 7:
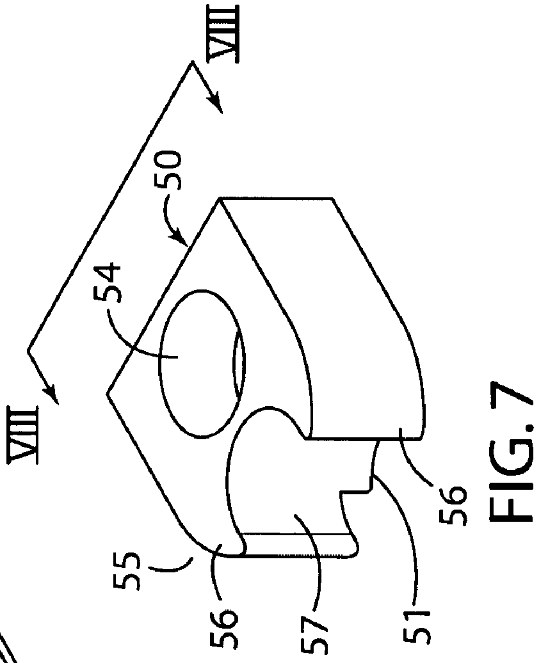
FIG. 7 is an isometric view of a clamp member forming a part of the device of FIG. 1.

Clamp members 50 (FIGS. 7 and 8) include a lower key portion 51 with opposite side surfaces 52. Key portions 51 are received in flame-cut notches 11 to position clamp members 50. Because the flame-cut notches 11 have relatively rough flame-cut surfaces, the size and shape of notches 11 tends to vary somewhat. Accordingly, key portions 51 are sized to provide a loose fit in notches 11. Clamp members 50 define lower surface portions 53 that contact upper surface 23 (FIG. 2) of part 12, and a counter-bored opening 54 that receives screw 29. End 55 (FIG. 7) of clamp member 50 includes a pair of extensions 56 with a cut-away portion 57 between extensions 56. Cut-away portion 57 provides clearance to machine precision notches 60 (FIG. 3) into part 12 adjacent flame-cut notches 11. Lower surfaces 53 preferably extend to the extensions 56 to provide a clamping force on surface 23 of part 12 in the vicinity of extensions 56.

Referring back to FIGS. 1 and 2, in use, a part 12 having flame-cut notches 11 pre-formed in perimeter 13 is positioned on plate 2 with notch-engaging portions 34 of support members 30 of retainers 10 positioned in flame-cut notches 11. Clamp members 50 are then positioned above support members 30, and screws 29 are tightened to thereby clamp part 12 to the support members 30. Support members 30 are held in position on plate 2 by cap screws (not shown) that engage T-nuts (also not shown) that are positioned in T-slots 4 of plate 2.

Figure 4:
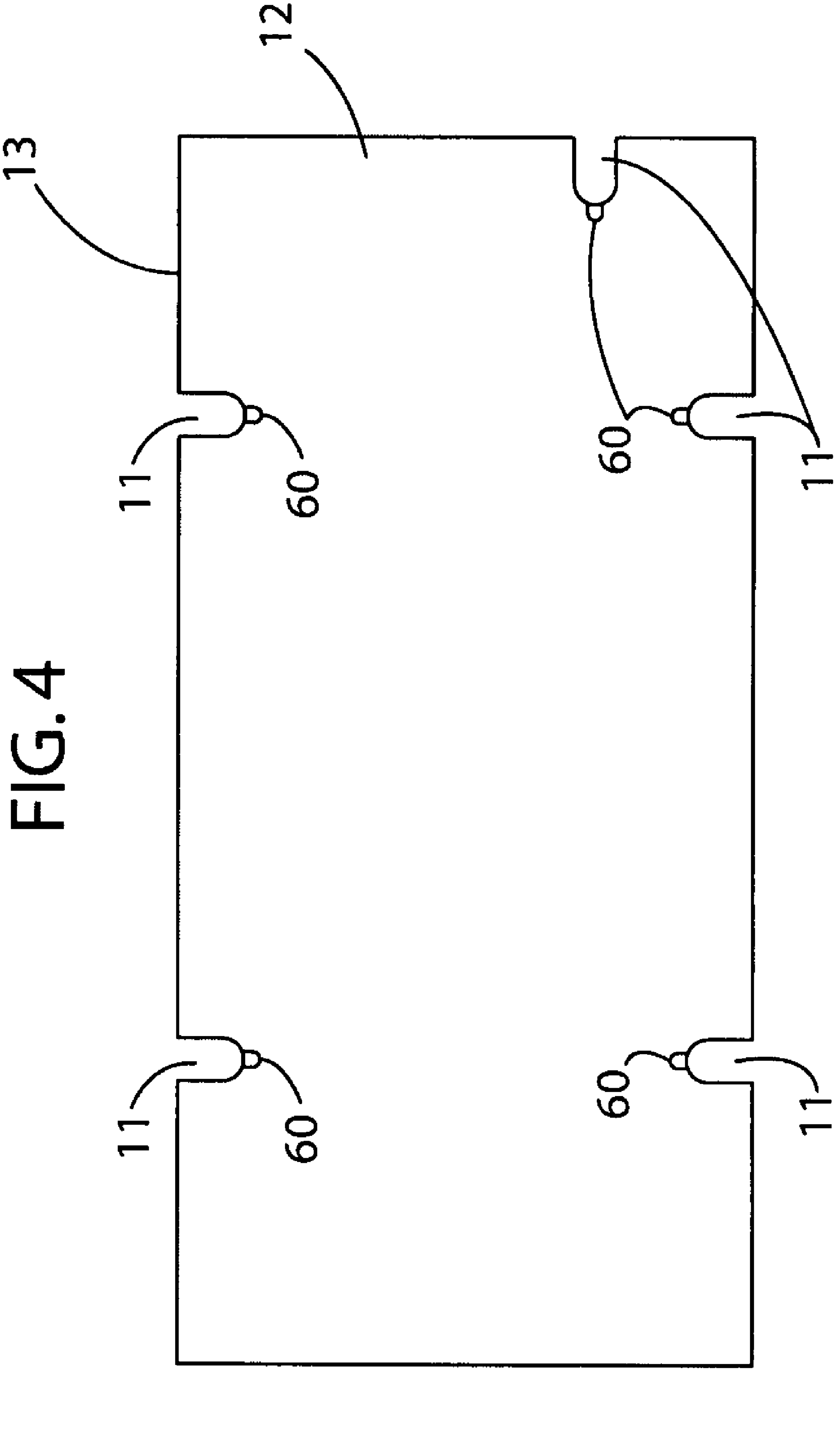
FIG. 4 is a plan view of a work piece showing flame-cut notches in the perimeter of the work piece and machined precision notches machined into the work piece at the flame-cut notches.

Various openings and other features are then machined into part 12 as required, and precision notches 60 (see also FIGS. 3 and 4) are machined into part 12 at flame-cut notches 11. Although precision notches 11 could take many forms, in the illustrated example notches 11 have side surfaces 61 that are orthogonal to upper surface 23 of part 12, and base surface 62 that is parallel to upper surface 23.

After the machining operations are completed on a first side of part 12, the screws 29 are loosened to release part 12, and part 12 is flipped over. Small protrusions 45 of support members 30 are then positioned in precision notches 60, and screws 29 are tightened to clamp part 12 to support members 30 and plate 2. The keys 37 of support members 30 securely and accurately position support members 30 on plate 2, and small protrusions 45 engage precision notches 60 of part 12 to accurately position part 12 on support members 30. Part 12 is thereby accurately positioned and retained for machining on a second side of part 12. In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method of machining plates made of hot-roll steel, the method comprising:

flame-cutting a plate-like work piece from an enlarged sheet of hot-roll steel, including flame-cutting a plurality of notches in a perimeter of the work piece, and wherein the work piece defines generally planar opposite upper and lower side surfaces, each notch defining notch surfaces extending between the upper and lower opposite side surfaces;

supporting the work piece on a bed of a machine tool by positioning support members in the flame-cut notches in contact with at least a portion of the notch surfaces, the support members including first support surfaces contacting the lower side surface of the work piece, and second support surfaces contacting the bed of the machine tool to thereby support the work piece on the bed with the lower side surface spaced apart from an upper surface of the bed;

securing the work piece to the bed of the machine tool;

machining a machined locating feature in the upper surface of the work piece adjacent and opening into each of said flame-cut notches;

releasing the work piece from the bed, reversing said work piece so that said upper side surface faces downwardly, and said lower side surface faces upwardly and supporting the work piece on the bed with said support members positioned in said flame-cut notches, and with the lower side surface facing upwardly with the first support surfaces of the support members contacting the upper surface of the work piece;

each said support members including a protrusion, having the configuration of said machined locating feature;

positioning said work piece with said machined locating features seated on said protrusions to thereby precisely locate the work piece on the bed of the machine tool.

2. The method of claim 1, wherein:

said machined locating features comprise small notches machined adjacent to and opening into the flame-cut notches.

3. The method of claim 1, wherein:

the step of flame-cutting the notches includes cutting the notches such that the notch surfaces extend orthogonally between the upper and lower side surfaces, and have a U-shape with generally planar opposite surfaces portions and a generally cylindrical base surface portion.

4. The method of claim 3, wherein:

the step of machining the locating features includes machining smaller U-shaped notches in said upper surface of said work piece, extending only a portion of the distance between said upper and lower work piece surfaces, and opening into said flame-cut notches through said base surface portion thereof.

5. The method of claim 4, wherein:

the U-shaped notches of the machined locating features include surface portions extending transverse to the opposite side surfaces of the work piece, and a generally planar base surface that is generally parallel to the opposite side surfaces of the work piece.

6. The method of claim 1, wherein:

the lower side surface of the work piece defines a plane;

the protrusions on the support members substantially prevent movement of the work piece in the plane when the protrusions are seated in said machined locating features;

the step of securing the work piece includes tightening a clamp.

7. The method of claim 1, wherein:

the work piece defines two generally parallel opposite side edges and transverse edge portions extending between the opposite side edges;

at least two notches are flame-cut in each of the opposite side edges;

at least one more notch is flame-cut in a transverse edge portion.

8. The method of claim 1, wherein:

each of the support members includes an elongated body portion having generally parallel opposite side surfaces and elongated protrusions extending outwardly from the opposite side surfaces, the elongated protrusions having generally parallel opposite surfaces forming the first and second support surfaces, wherein the first and second surfaces are orthogonal to the opposite side surfaces of the support members, and wherein:

portions of the elongated protrusions are positioned between the work piece and the bed of a machine tool.

9. The method of claim 8, wherein:

the bed of the machine tool includes a plurality of upwardly-opening elongated slots, each slot having parallel slot surfaces facing one another;

the support members each include an extension forming a key that is closely received in the slots to substantially prevent movement of the support members transverse to the slot surfaces.

10. The method of claim 1, in which said machined locating feature extends only a portion of the distance between said upper and lower work piece surfaces.

* * * * *